Sept. 16, 1958     W. O. HANSEN     2,852,739
REMOTE CONTROLLED IMPEDANCE MEASURING CIRCUIT
Filed July 26, 1954
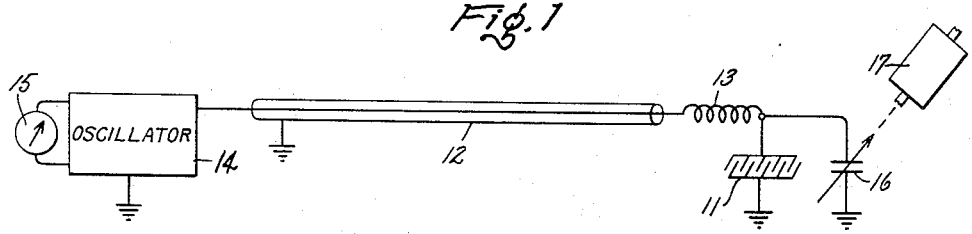
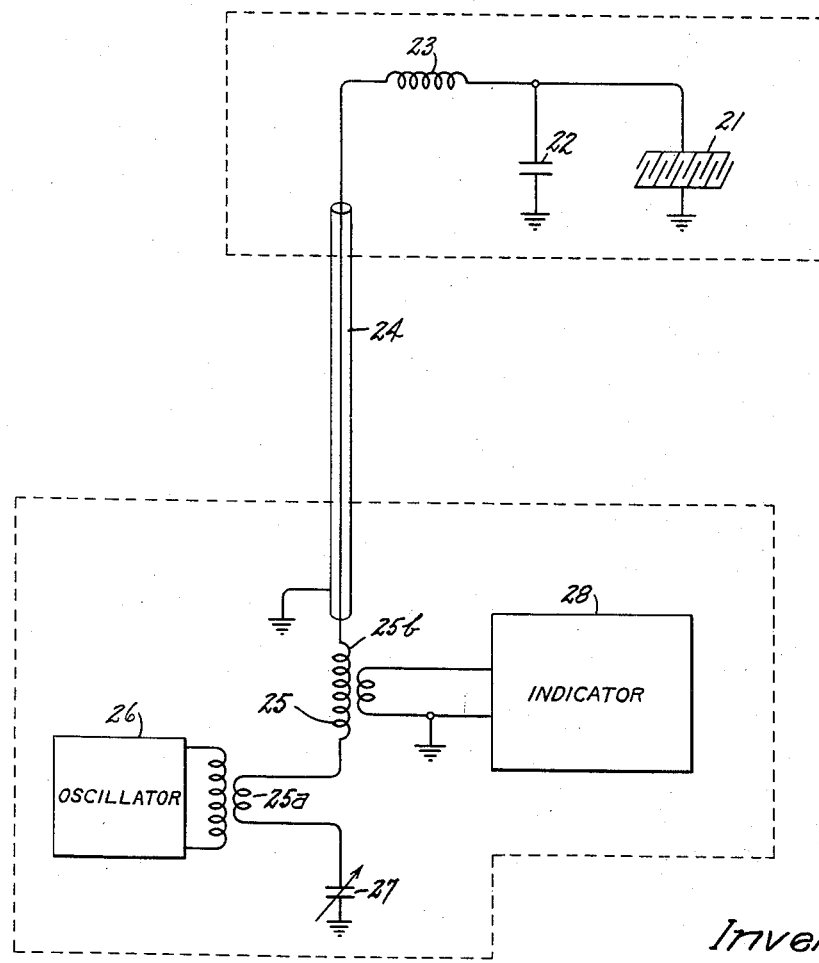
Inventor
Wilbur O. Hansen
by Merton D. Morse
His Attorney

United States Patent Office 2,852,739
Patented Sept. 16, 1958

2,852,739

REMOTE CONTROLLED IMPEDANCE MEASURING CIRCUIT

Wilbur O. Hansen, Schenectady, N. Y., assignor to General Electric Company, a corporation of New York Application July 26, 1954, Serial No. 445,658

8 Claims. (Cl. 324—61)

The present invention relates to a measuring circuit for monitoring apparatus.

More particularly, the invention relates to a remotely controlled measuring circuit for a monitoring apparatus of the type that provides an indication of the change in electrical impedance in a sensing element brought about by some change in the physical or chemical characteristics of an object being monitored. An example of an instrument of this type is a moisture monitor which utilizes a capacitive sensing element, the capacitance of which is determined primarily by the moisture content of the material being monitored.

Because it is generally impossible to locate the indicator and the energizing source of instruments of the above type at the same point as the sensing element thereof, it is necessary to couple these elements through sometimes relatively long lead-in conductors whose impedance characteristics tend to mask changes in impedance of the sensing element. To overcome this tendency, it has been necessary to tune the sensing element to or near to the operating frequency of the energizing signals supplied thereto, and to measure changes in the current that result from detuning of the series resonant circuit caused by changes in reactance of the sensing element. Because of the relatively low impedance of the series tuned circuit, changes in the relatively high impedance of the lead-in conductors which is in parallel with the series circuit have little or not effect on measurements obtained with the instrument; however, a practical difficulty exists with regard to maintaining the sensing element at or near series resonance. With existing instruments, tuning the circuit elements to maintain the measuring circuit at or near resonance, is accomplished by a remotely controlled motor shafted to the tuning element. While arrangements of this sort have been used satisfactorily, they are not entirely suitable in that they increase the complexity of the instrument and its cost, complicate its manufacture and operation, and are not entirely reliable. In order to overcome these difficulties, the present invention was developed.

It is, therefore, one object of the present invention to provide a new and improved measuring circuit for a monitoring apparatus that can easily be maintained in proper alignment by direct adjustments at a point located remotely from the sensing element while the apparatus is in operation.

Another object of the invention is to provide an improved measuring circuit for a monitoring apparatus which is simple in construction, and relatively inexpensive to manufacture.

A still further object of the invention is to provide a monitoring apparatus having the above set forth characteristics which is entirely reliable in operation.

In practicing the invention, a measuring circuit for a monitoring apparatus is provided which comprises a sensing element adapted to have the electrical impedance characteristics thereof varied by changes in the physical or chemical characteristics of an article being monitored. A complementary reactance is connected in series circuit relationship with the sensing element for roughly tuning the resultant circuit produced thereby to a desired operating frequency and a lead-in conductor is connected to the sensing element for supplying an energizing electric signal thereto. A fine tuning circuit is connected to the lead-in conductor at the end thereof remote from the sensing element and is connected in series circuit relationship with the sensing element. This tuning element then serves to series resonate the entire circuit arrangement to or near to the operating frequency of the energizing signal.

Other objects, features and many attendant advantages of the invention will be appreciated more readily as the same become better understood with reference to the following detailed description, when considered in connection with the accompanying drawings, wherein:

Fig. 1 is a schematic circuit diagram of a presently known measuring circuit arrangement for use in monitoring apparatus of the above-discussed type; and Fig. 2 is a schematic circuit diagram of a measuring circuit arrangement constructed in accordance with the present invention.

The measuring circuit arrangement shown in Fig. 1 of the drawings comprises a sensing element 11. If desired the sensing element 11 may comprise a capacitor formed by two sets of interspaced finger-like electrode members set into the top surface of the flat plate-like insulating support. The substance or article which is being tested or monitored to determine its moisture content, for example, is placed over the finger-like plate members, and, by reason of its moisture content, affects the dielectric between the finger-like plate members to thereby vary the capacitance of the element. It is this variation in capacitance that is desired to be measured by the circuit arrangement described hereinafter.

Because it is often impractical to locate the source of energizing electric signals supplied to the sensing element 11 as well as the indicating meters associated with the element, at the same location as the sensing element, it is necessary to connect these latter two elements to the sensing element through a length of lead-in conductor 12. At the frequency generally used in this type of monitoring equipment the cable 12 represents essentially a lumped capacitance, said capacitance being generally much larger than that of the sensing element. Such a cable cannot therefore practically be connected in parallel with the sensing element without having variations in its capacitance due to flexing, temperatures, etc. mask the desired variations in the sensing capacitance.

In order to circumvent this problem, a complementary reactance 13, in this instance an inductance, is connected in series electrical circuit relationship with the sensing element 11. The value of inductance 13 is selected so that the series circuit formed by inductance 13 and sensing element 11 is roughly resonated to the operating frequency of the energizing electric signals supplied to the sensing element. The energizing electric signals are supplied through the lead-in conductor 12 from a source 14 connected to the end of the conductor 12 remote from the sensing element 11, and an indicating instrument 15 is connected for the purpose of providing a measurement of the current supplied to the sensing element. For various operational and calibrating purposes and to compensate for temperature drifts in capacitance of the head, it is necessary to connect a tuning capacitor 16 in parallel circuit relationship with the sensing element 11 for the purpose of continually maintaining the circuit thus far described resonant at or near resonant to the operating frequency of the energizing signal supplied from the source 14. This tuning capacitor must necessarily comprise a variable capacitor whose movable capacitor plate is mechanically connected to a remotely-controlled tuning motor 17.

In operation, objects or articles to be monitored by this apparatus are placed over the sensing element 11 and, depending upon their characteristics, affect the capacitance of the element. Variations in the capacitance of the sensing element 11 detunes the series resonant circuit comprised in part by the sensing element so that a change in current flowing through the circuit occurs. This change in current is of sufficient magnitude to be measured by the indicating instrument 15. By proper calibration of the indicating instrument 15, the changes in current can be correlated with various characteristics of the object being monitored. If, for example, the object is to be monitored for moisture content, the indicating instrument 15 may be calibrated in terms of moisture content so for any given amplitude of variation in the energizing current supplied to the sensing element, a corresponding moisture content level variation can easily be identified.

In order to maintain proper operation of a measuring circuit constructed in the above-identified mannner, it is necessary that the circuit frequently be tuned, and because in presently known measuring circuits the tuning elements have been positioned in the same location as the sensing element 11, the tuning capacitor must be adjusted by the remotely-controlled motor 17 shafted to the movable plate thereof. Measuring circuits have been positioned in the same location as the sensing element 11, and a suitable motor control circuit provided at a remote control location where the source of energizing signals 14, and indicating instrument 15 are located. The requirement for the additional motor control circuit thus complicates the manufacture and operation of the measuring circuit, and increases its expense. Further, for calibration purposes, it is frequently necessary to know the exact value of capacitance added to the series circuit by the tuning capacitor at any instant. This requirement makes it necessary that a remote indicator of the value of capacitance connected into the circuit by the tuning capacitor 16 be provided at the remote position control station. Hence, further mechanical shafting is required which introduces the possibility of error occurring as a result of any slack between the motor position indicator and the exact value of capacitance introduced into the circuit by the tuning capacitor 16. Additionally, because of the innate characteristics of any remote control system it is not always possible to exactly position the tuning capacitor 16 at a desired value of capacitance so as to tune the circuit.

The measuring circuit arrangement comprising the present invention and shown in Fig. 2 of the drawings preferably includes a sensing element 21 which constitutes a capacitor formed by two sets of intermeshed finger-like plate elements embedded in a flat plate-like insulating support. The object or article to be monitored is placed on the support over the element and operates to change the capacitor by an amount determined by the charactristic to be measured. For example, if moisture content is to be measured, then the changes in capacitance are related to the changes in moisture content of the article being monitored. A fixed capacitor 22 is connected in parallel circuit relationship with sensing element 21 and a first complementary reactance comprising a fixed inductance 23 is connected in series circuit relationship with the sensing element 21 and fixed capacitor 22.

The capacitor 22 and inductance 23 are selected so that the series-electrical circuit thus formed is close enough to resonance at the operating frequency of the energizing electric signals supplied to the sensing element through a lead-in conductor 24 comprising a coaxial cable that the resulting impedance is small compared with that of the cable 24 having inherent reactance in parallel circuit relationship with the series connected complementary reactance and sensing element. The impedance of the sensing element 21, fixed capacitor 22 and inductance 23 are thereby unaffected by changes in the characteristics of cable 24 caused by flexing, temperature changes, etc., and appears as essentially the same value at the input end of cable 24. The lead-in conductor 24 has a second inductance 25 connected to the end thereof remote from the sensing element 21, which is made up of two portions 25a and 25b. The portion 25a of the second inductance preferably comprises the secondary winding of a transformer having a source of energizing electric signals 26 coupled to the primary winding thereof. In this manner, energizing electric signals are supplied through the lead-in conductor 24 to the sensing element 21. Connected in series electrical circuit relationship with the second inductance 25 is a variable capacitor 27 which serves in conjunction with inductance 25 to tune the reactance of sensing element 21, fixed capacitor 22 and first inductance 23 as it appears at the input end of cable 24 to or near resonance of the operating frequency of the energizing electric signals supplied from source 26. A suitable circuit for measuring the current through the series circuit described is provided. Fig. 2 shows a typical circuit wherein the voltage coupled into coil 29 from coil 25b is proportional to the current in coil 25b and is measured by a vacuum tube circuit 28. Suitable circuits for measuring the voltage across any series element such as capacitor 27 would be equally satisfactory. Direct measurement of current by a thermocouple also is suitable.

In operation, the measuring circuit comprising the invention and shown in Fig. 2 is very similar to the circuit arrangement illustrated in Fig. 1 of the drawings. Energizing electric signals are supplied from the source 26 through the coupling portion 25a of the second inductance 25, and through the lead-in conductor 24 to the sensing element 21. As previously stated, the object to be monitored is placed on the sensing element and variations in the charatceristics thereof, such as the moisture content, produces a change in the impedance characteristics of the sensing element. Since the sensing element 21 has been described as a capacitive sensing element, this impedance means occurs as a change in capacitance in the element. The invention is not limited to use with capacitive sensing element, however, and in no way should be thus restricted. The values of capacitance of the sensing element 21 and the fixed capacitor 22 have been so chosen that the first inductance 23 roughly resonates the series circuit comprised of these three elements to the operating frequency of the energizing signal supplied from the source 26. The variable capacitor 27 is then adjusted to tune the entire circuit arrangement including the conductor 24, second inductance 25 and the capacitor 27 to a desired portion of the resonant current vs. capacitance curve. Typically this is at some point on the sides of the curve near resonance where the current vs. capacitance curve is nearly linear. This is accomplished even though the variable tuning capacitor 27 is located in a remote position from the sensing element 21 along with the source of energizing signals 26 and the output indicator 28. Variations in the characteristics desired to be measured of the object placed on sensing element 21 produce a change in the impedance of the sensing element, and operate to detune the series circuit thereby to produce a measurable change in the current flowing through the circuit. The changes in current are indicated by the indicating meter 28 and by proper calibration of the meter, may readily be translated into indications of changes in the characteristics of the object being monitored.

From a consideration of the arrangement shown in Fig. 2 of the drawings, it is apparent that by locating the tuning capacitor 27 in the same position with the indicating meter 28 and the source of energizing signals 26, applicant's invention has done away with the need for the tuning motor and associated motor control circuit for the variable capacitor which has heretofore had to be placed in the same location as the sensing element. Thus, applicant has greatly simplified the construction of the measurement circuit and decreased its cost. Additionally, direct mechanical connection may be provided between the movable capacitor plate of the tuning capacitor 27, and an indicator located on the same panel as the indicating meter 28 so that there is no possibility of error occurring between the value of the capacitance added to the circuit by the variable tuning capacitor and that indicated at the remote position control station. By this arrangement there is no possibility of error being introduced due to mis-calibration of the amount of capacitance added to the circuit by the variable tuning capacitor. Additionally, because the variation in the tuning capacitor 27 is directly controlled in applicant's arrangement it can be adjusted in much finer steps to thereby assure that the circuit with which it is used can be brought to the exact point of resonance. Hence, an operator has much finer control over the operation of the measuring circuit arrangement of applicant's. Further, because there are no mechanical linkages or remotely located control systems required in applicant's arrangement, the possibility of errors due to slippage in the mechanical interconnections or control system is reduced, and the instrument is much more reliable in operation.

Obviously, other modifications and variations of the present invention will be suggested to those skilled in the art in the light of the above teachings. It is, therefore, to be understood that changes may be made in the invention which are within the full intended scope as defined in the appended claims.

What I claim as new and desire to secure by Letters Patent of the United States is:

1. A monitoring apparatus comprising a sensing element adapted to have the electrical independence characteristics thereof varied by the article being monitored, a complementary reactance connected in series circuit relationship with said sensing element for roughly series tuning the resultant circuit to a desired operating frequency, a lead-in conductor connected to said series connected complementary reactance and sensing element for supplying an energizing signal thereto, said lead-in conductor having inherent reactance in parallel circuit relationship with said series connected complementary reactance and sensing element, and a fine tuning element connected to said lead-in conductor at the end thereof remote from said sensing element and in parallel circuit relationship with said inherent reactance of said lead-in conductor to form a series circuit resonating to the operating frequency of the energizing signal the series circuit comprising said complementary reactance, said sensing element and said fine tuning element.

2. A monitoring apparatus comprising a capacitive sensing element adapted to have the capacitance thereof varied by the article being monitored, an inductance connected in series circuit relationship with said sensing element for roughly series tuning the resultant circuit to a desired operating frequency, a lead-in conductor connected to said series connected inductance and sensing element for supping an energizing signal thereto, said lead-in conductor having inherent reactance in parallel circuit relationship with said series connected inductance and sensing element, a fine tuning element connected to said lead-in conductor at the end thereof remote from said sensing element and in parallel circuit relationship with said inherent reactance of said lead-in conductor to form a series circuit resonating to the operating frequency of the energizing signal the series circuit comprising said sensing element, said inductance and said fine tuning element, and means coupled to said series circuit for measuring the current flow therethrough as affected by changes in impedance of the sensing element.

3. A moisture monitor comprising a capacitive sensing element adapted to have the capacitance thereof varied by the moisture content of an article being monitored, an inductance connected in series circuit relationship with said sensing element for roughly series tuning the resultant circuit to a desired operating frequency, a coaxial conductor connected to said series connected inductance and sensing element, said coaxial conductor having inherent reactance in parallel circuit relationship with said series connected sensing element and inductance, a source of energizing signals operatively coupled to said coaxial conductor for supplying an energizing signal thereto, a variable tuning capacitor connected to said coaxial conductor at the end thereof remote from said sensing element in parallel circuit relationship with said inherent reactance of said coaxial conductor to form a series circuit resonating to the operating frequency of the energizing signal the series circuit comprising said capacitive sensing element, said inductance and said variable tuning capacitor, and means coupled to said series circuit for measuring the current flow therethrough as affected by changes in impedance of the sensing element.

4. A monitoring apparatus comprising a sensing element adapted to have the electrical impedance characteristic thereof varied by the article being monitored, a first reactance connected in series circuit relationship with said sensing element for roughly resonating the circuit thus comprised to a desired operating frequency, a lead-in conductor connected to the series circuit formed by said sensing element and said first reactance, said lead-in conductor having inherent reactance in parallel circuit relationship with said series connected sensing element and first reactance, a second reactance connected to said lead-in conductor at the end thereof remote from said series circuit, means for operatively coupling a source of energizing signals to said lead-in conductor, a complementary variable reactance connected in series circuit relationship with said second reactance at said remote end to form a series circuit resonating to the operating frequency of the energizing signals, the series circuit comprising said sensing element, first reactance, second reactance and complementary variable reactance, and said series connected second reactance and complementary variable reactance being connected in parallel circuit relationship with said inherent reactance of said lead-in conductor, and means coupled to said series circuit for measuring the current flow therethrough as affected by changes in impedance of the sensing element.

5. A monitoring apparatus comprising a capacitive sensing element adapted to have the capacitance thereof varied by the article being monitored, a first inductance connected in series circuit relationship with said sensing element for roughly resonating the circuit thus comprised to a desired operating frequency, a coaxial cable connected to the series circuit formed by said sensing element and said first inductance, said coaxial cable having inherent reactance in parallel circuit relationship with said series connected sensing element and first inductance, a second inductance connected to said coaxial cable at the end thereof remote from said series circuit, means for coupling a source of energizing signals to at least a portion of said second inductance, and a variable capacitor connected in series circuit relationship with said second inductance at said remote end to form a series circuit resonating to the operating frequency of the energizing signals, the series circuit comprising said sensing element, first inductance, second inductance and variable capacitor, and said series connected second inductance and variable capacitor being connected in parallel circuit relationship with said inherent reactance of said coaxial cable.

6. A monitoring apparatus comprising a capacitive sensing element adapted to have the capacitance thereof varied by the article being monitored, a first inductance connected in series circuit relationship with said sensing element for roughly resonating the circuit thus comprised to a desired operating frequency, a coaxial cable connected to the series circuit formed by said sensing element and said first inductance, said coaxial cable having inherent reactance in parallel circuit relationship with said series-connected sensing element and first inductance; a second inductance connected to said coaxial cable at the end thereof remote from said series circuit, means for coupling a source of energizing signals to at least a portion of said second inductance, a variable capacitor connected in series circuit relationship with said second inductance at said remote end to form a series circuit resonating to the operating frequency of the energizing signals, the series circuit comprising said sensing element, first inductance, second inductance and variable capacitor, said series connected second inductance and variable capacitor being in parallel circuit relationship with said inherent reactance of said coaxial cable, and means coupled to said second inductance for measuring the current flow through said series circuit as affected by changes in impedance of the sensing element.

7. A moisture monitor comprising a capacitive sensing element formed by two sets of intermeshed finger-like plates embedded in an insulating plate and adapted to have the capacitance thereof varied by the moisture content of an article being monitored, a fixed value trimmer capacitor connected in parallel circuit relationship with said sensing element, a first inductance connected in series circuit relationship with said sensing element for roughly resonating the circuit thus comprised to a desired operating frequency, a coaxial cable connected to the series circuit formed by said sensing element and said first inductance, said coaxial cable having inherent reactance in parallel circuit relationship with said series connected first inductance and sensing element, a second inductance connected to said coaxial cable at the end thereof remote from said series circuit, means for coupling a source of energizing signals to at least a portion of said second inductance, and a variable capacitor connected in series circuit relationship with said second inductance at said remote end to form a series circuit resonating to the operating frequency of the energizing signals, the series circuit comprising said sensing element, first inductance, second inductance and variable capacitor, said series connected second inductance and variable capacitor being in parallel circuit relationship with said inherent reactance of said coaxial cable, and means coupled to said second inductance for measuring the current flow through said series circuit as affected by changes in impedance of the sensing element.

8. A monitoring apparatus comprising a sensing element adapted to have the electrical impedance characteristic thereof varied by the article being monitored, a first reactance connected in series circuit relationship with said sensing element for roughly resonating the circuit thus comprised to a desired operating frequency so that its impedance is low relative to that of a lead-in conductor connected to the series circuit formed by said sensing element and said first reactance, said lead-in conductor having inherent reactance in parallel circuit relationship with said series circuit, a variable reactance connected to said lead-in conductor at the end thereof remote from said series circuit for the purpose of tuning the residual reactance of said series circuit to or near resonance to the operating frequency of the energizing circuit, said variable reactance being in parallel circuit relationship with said inherent reactance of said lead-in conductor, means for operatively coupling a source of energizing signals to said lead-in conductor, and means for measuring current through said series circuit as affected by changes in impedance of the sensing element.

References Cited in the file of this patent
UNITED STATES PATENTS

| | | |
|---|---|---|
| 2,076,944 | Howe | Apr. 13, 1937 |
| 2,439,047 | Grinstead et al. | Apr. 6, 1948 |
| 2,543,570 | Eder | Feb. 27, 1951 |
| 2,617,859 | Kraft | Nov. 11, 1952 |

UNITED STATES PATENT OFFICE
CERTIFICATE OF CORRECTION

Patent No. 2,852,739 September 16, 1958

Wilbur O. Hansen

It is hereby certified that error appears in the printed specification of the above numbered patent requiring correction and that the said Letters Patent should read as corrected below.

Column 5, line 36, for "independence" read -- impedance --.

Signed and sealed this 5th day of April 1960.

(SEAL)
Attest:

KARL H. AXLINE
Attesting Officer

ROBERT C. WATSON
Commissioner of Patents